United States Patent
Yang

(10) Patent No.: US 11,414,724 B2
(45) Date of Patent: Aug. 16, 2022

(54) AGENT FOR SELECTIVE ANTIMONY AND ARSENIC REMOVAL AND TIN RETAINING FOR REFINING SECONDARY CRUDE LEAD, AND USE METHOD THEREOF

(71) Applicant: JIANGSU NEW CHUNXING RESOURCE RECYCLING CO., LTD., Pizhou (CN)

(72) Inventor: Chunming Yang, Pizhou (CN)

(73) Assignee: JIANGSU NEW CHUNXING RESOURCE RECYCLING CO., LTD., Pizhou (CN)

( * ) Notice: Subject to any disclaimer, the term of this patent is extended or adjusted under 35 U.S.C. 154(b) by 0 days.

(21) Appl. No.: 17/058,136

(22) PCT Filed: May 12, 2019

(86) PCT No.: PCT/CN2019/086506
§ 371 (c)(1),
(2) Date: Nov. 24, 2020

(87) PCT Pub. No.: WO2019/223559
PCT Pub. Date: Nov. 28, 2019

(65) Prior Publication Data
US 2021/0198770 A1 Jul. 1, 2021

(30) Foreign Application Priority Data
May 25, 2018 (CN) .......................... 201810518994.4

(51) Int. Cl.
*C22B 13/08* (2006.01)
*C22B 13/02* (2006.01)

(52) U.S. Cl.
CPC ............ *C22B 13/08* (2013.01); *C22B 13/025* (2013.01)

(58) Field of Classification Search
CPC ....... C22B 13/08; C22B 13/025; C22B 13/10; C22B 13/00; C22B 9/10; C22B 30/00; C22B 30/02; C22B 5/04; C22B 9/103; C22B 9/106; C22B 9/12; C22C 24/00; B22F 2301/052; B22F 2301/056; B22F 2302/40; B22F 2302/403
USPC .......... 75/732, 690–692, 693–702, 703, 704, 75/706, 725
See application file for complete search history.

(56) References Cited

U.S. PATENT DOCUMENTS 4,911,755 A * 3/1990 Larouche ................ C22B 13/06
75/701
8,500,845 B2 * 8/2013 Pizzuto ................... C22B 13/06
75/697

FOREIGN PATENT DOCUMENTS

| CN | 102011015 A | 4/2011 |
|---|---|---|
| CN | 105063369 A | 11/2015 |
| CN | 106282659 A | 1/2017 |
| CN | 108588453 A | 9/2018 |
| CN | 108695572 A | 10/2018 |
| CN | 108707761 A | 10/2018 |
| CN | 108711652 A | 10/2018 |
| CN | 108728648 A | 11/2018 |
| JP | 5743074 B2 | 7/2015 |

\* cited by examiner

*Primary Examiner* — Anthony J Zimmer
*Assistant Examiner* — Jacob J Gusewelle
(74) *Attorney, Agent, or Firm* — Bayramoglu Law Offices LLC

(57) ABSTRACT

An agent for selective antimony and arsenic removal and tin retaining includes 10-30 wt % of aluminum, 65-85 wt % of calcium, 1-10 wt % of coke powder, and 1-5 wt % of lead powder. According to the content of antimony in lead, the antimony and arsenic removal and tin retaining agent is added to a molten lead which is at a temperature of about 550-650° C. at a certain proportion so as to carry out an antimony and arsenic removal reaction; after the reaction is completed, cooling is carried out, and antimony and arsenic scum is fished out to obtain a molten lead with antimony and arsenic removed; the content of antimony and arsenic is reduced to 0.0005 wt % or less, and the content of tin is substantially unchanged. The production costs for lead alloy preparation are reduced, and no smoke and odor appear in an antimony and arsenic removal reaction process.

2 Claims, No Drawings

AGENT FOR SELECTIVE ANTIMONY AND ARSENIC REMOVAL AND TIN RETAINING FOR REFINING SECONDARY CRUDE LEAD, AND USE METHOD THEREOF

CROSS REFERENCE TO THE RELATED APPLICATIONS

This application is the national phase entry of International Application No. PCT/CN2019/086506, filed on May 12, 2019, which is based upon and claims priority to Chinese Patent Application No. 201810518994.4, filed on May 25, 2018, the entire contents of which are incorporated herein by reference.

TECHNICAL FIELD

The present invention relates to the field of refinement and impurity removal of secondary crude lead, and particularly to a selective antimony and arsenic removal and tin retaining agent for refining secondary crude lead and a use method thereof.

BACKGROUND

In the production process of secondary lead, crude lead contains impurities such as antimony, tin, arsenic, iron, cadmium and copper, and the impurities in the crude lead must be subjected to refinement and impurity removal. Traditional lead refinement for removing impurities such as antimony, arsenic and tin includes two methods, i.e. oxidation refinement and alkaline refinement, where the oxidation refinement removes the impurities by using oxygen in the air for oxidation and slagging of the impurities, and the alkaline refinement removes the impurities by using sodium nitrate as an oxidant for oxidation and slagging of the impurities. Because the three metal elements, antimony, arsenic and tin, have similar chemical properties, they are all removed at the same time during the refinement and impurity removal. During preparation of low-antimony and high-tin lead alloys, and antimony-free and tin-containing lead alloys, regardless of whether oxidation refinement or alkaline refinement is employed, the high-value metal tin in the crude lead will be oxidized into the refining slag, leading to a massive waste of tin resources and an increase in production costs.

SUMMARY

The present invention aims to provide an agent for selective antimony and arsenic removal and tin retaining for refining secondary crude lead and a use method thereof, to solve the problem of a massive waste of tin resources in oxidation refinement and alkaline refinement methods of the prior art.

The technical solution of the present invention is realized by the agent for antimony and arsenic removal and tin retaining consisting of 10-30 wt % of aluminum, 65-85 wt % of calcium, 1-10 wt % of coke powder, and 1-2 wt % of lead powder, based on the total mass of the antimony and arsenic removal and tin retaining agent of 100, wherein the calcium, aluminum, coke powder, and lead powder are thoroughly mixed in the above mass ratio to produce the antimony and arsenic removal and tin retaining agent.

As a first preferred alternative, the agent for selective antimony and arsenic removal and tin retaining-consists of 10 wt % of the aluminum, 80 wt % of the calcium, 8 wt % of the coke powder, and 2 wt % of the lead powder, based on the total mass of the selective antimony and arsenic removal and tin retaining agent of 100.

As a second preferred alternative, the agent for selective antimony and arsenic removal and tin retaining consists of 25 wt % of the aluminum, 72 wt % of the calcium, 2 wt % of the coke powder, and 1 wt % of the lead powder, based on the total mass of the selective antimony and arsenic removal and tin retaining agent of 100.

As a third preferred alternative, the agent for selective antimony and arsenic removal and tin retaining consists of 30 wt % of the aluminum, 67 wt % of the calcium, 2 wt % of the coke powder, and 1 wt % of the lead powder, based on the total mass of the selective antimony and arsenic removal and tin retaining agent of 100.

The agent for selective antimony and arsenic removal and tin retaining of the present invention is used for refinement and antimony and arsenic removal production of primary lead and secondary crude lead.

A use method of employing the above agent for selective antimony and arsenic removal and tin retaining for refining secondary crude lead to remove antimony and arsenic from the crude lead includes the following steps:

Step (1): weighing each of the components in the mass ratio, and uniformly mixing the components to form an antimony and arsenic removal composition;

Step (2): heating the crude lead from which the antimony and arsenic are to be removed for melting and heating up to 340-500° C., taking a sample and subjecting the sample to a spectral analysis to obtain a total content of the antimony and arsenic in a refining pot, followed by heating up to 580-650° C., and then adding the antimony and arsenic removal and tin retaining agent into the refining pot in an amount which is 1-1.5 times more than the total content of the antimony and arsenic; turning on a stirrer to stir the molten lead to generate a vortex, wherein the antimony and arsenic removal and tin retaining agent is added at a speed which should not affect normal existence of the vortex, allowing the antimony and arsenic removal and tin retaining agent to melt into the molten lead to combine with the antimony and arsenic to form an antimonide, which floats on a surface of the molten lead, and further stirring for 10-60 min after adding the antimony and arsenic removal and tin retaining agent; and Step (3): by allowing the molten lead to stand and cool down, reducing the temperature of the molten lead after reaction to 480° C. or lower, and adding coal powder or sawdust, followed by stirring to remove the remaining calcium and aluminum until a white pasty slag becomes a loose black powdery slag, fishing out the ash slag, so that the antimony and arsenic in the molten lead are reduced to 0.0005% or less and tin content is substantially unchanged.

Beneficial effects: As a result of the above-mentioned solutions, the coke powder in the antimony and arsenic removal and tin retaining agent of the present invention can avoid the slagging in the molten lead at a high temperature, which is beneficial to prevent the oxidation of lead. A small amount of the lead powder can promote the antimony and arsenic removal and tin retaining agent to dissolve fully and quickly in the molten lead. The calcium and aluminum in the antimony and arsenic removal and tin retaining agent can react with antimony and arsenic at a high temperature to form the antimonide and arsenide. During the process of removing antimony and arsenic, the antimonide and arsenide formed have a high melting point, a very low solubility in the molten lead, and a density lower than lead, and thus, can precipitate from the molten lead and float on the molten lead to become a scum. As the temperature decreases, under the action of stirring by the stirrer, the antimonide and arsenide further float out of the molten lead and are removed, to achieve a deep separation of antimony and arsenic from the molten lead, so that the content of antimony and arsenic in the molten lead can be reduced to 0.0005% or less, while the tin content is substantially unchanged. The problem of a massive waste of tin resources in oxidation refinement and alkaline refinement methods of the prior art is solved, thereby achieving the purpose of the present invention.

The present invention has the following advantages as compared with the existing methods for removing antimony and arsenic from crude lead:

1. Antimony and arsenic can be selectively removed, the valuable metal tin is greatly retained in lead, and the production costs for preparing alloys are reduced.

2. The content of antimony and arsenic in lead is reduced to as low as 0.0005%, which is far below China's national standard, and the removal rate of antimony and arsenic is high.

3. The antimony and arsenic removal reaction is fast, with less amount of agents used, and less amount of slagging.

4. The present invention is carried out in a simple and reliable manner, and thus has a wide range of application, and has no smoke and odor in the reaction process, and has a good working environment.

DETAILED DESCRIPTION OF THE EMBODIMENTS

The agent for antimony and arsenic removal and tin retaining of the present invention consists of 10-30 wt % of aluminum, 65-85 wt % of calcium, 1-10 wt % of coke powder, and 1-2 wt % of lead powder, based on the total mass of the agent for antimony and arsenic removal and tin retaining of 100, where the calcium, aluminum, coke powder, and lead powder are thoroughly mixed in the above mass ratio, to produce the antimony and arsenic removal and tin retaining agent.

As a first preferred alternative, the agent for selective antimony and arsenic removal and tin retaining consists of 10 wt % of the aluminum, 80 wt % of the calcium, 8 wt % of the coke powder, and 2 wt % of the lead powder, based on the total mass of the agent for selective antimony and arsenic removal and tin retaining of 100.

As a second preferred alternative, the agent for selective antimony and arsenic removal and tin retaining consists of 25 wt % of the aluminum, 72 wt % of the calcium, 2 wt % of the coke powder, and 1 wt % of the lead powder, based on the total mass of the agent for selective antimony and arsenic removal and tin retaining of 100.

As a third preferred alternative, the agent for selective antimony and arsenic removal and tin retaining consists of 30 wt % of the aluminum, 67 wt % of the calcium, 2 wt % of the coke powder, and 1 wt % of the lead powder, based on the total mass of the agent for selective antimony and arsenic removal and tin retaining of 100.

The agent for selective antimony and arsenic removal and tin retaining of the present invention is used for refinement and antimony and arsenic removal production of primary lead and secondary crude lead.

A use method of employing the above agent for selective antimony and arsenic removal and tin retaining for refining secondary crude lead to remove antimony and arsenic from the crude lead includes the following steps:

Step (1): weighing each of the components in the mass ratio, and uniformly mixing the components to form an antimony and arsenic removal composition;

Step (2): taking a sample and subjecting the sample to a spectral analysis to obtain a total content of the antimony and arsenic in a refining pot, followed by heating up to 580-650° C., and then adding the antimony and arsenic removal and tin retaining agent into the refining pot in an amount which is 1-1.5 times more than the total content of the antimony and arsenic; turning on a stirrer to stir the molten lead to generate a vortex, wherein the antimony and arsenic removal and tin retaining agent is added at a speed which should not affect normal existence of the vortex, allowing the antimony and arsenic removal and tin retaining agent to quickly melt into the molten lead to combine with the antimony and arsenic to form an antimonide, which floats on a surface of the molten lead, and further stirring for 10-60 min after adding the antimony and arsenic removal and tin retaining agent; and Step (3): by allowing the molten lead to stand and cool down, reducing the temperature of the molten lead after reaction to 480° C. or lower, and adding coal powder or sawdust, followed by stirring to remove the remaining calcium and aluminum until a white pasty slag becomes a loose black powdery slag, and fishing out the slag, so that the antimony and arsenic in the molten lead are reduced to 0.0005% or less and tin content is substantially unchanged.

The technical solutions of the present invention will be further explained below through examples.

Example 1: the agent for selective antimony and arsenic removal and tin retaining consisted of 10 wt % of aluminum, 80 wt % of calcium, 8 wt % of coke powder, and 2 wt % of lead powder, based on the total mass of the agent for selective antimony and arsenic removal and tin retaining of 100.

Secondary crude lead was weighed into a refining pot, heated for melting, and heated up to 500° C. A copper removal agent was used to remove copper, and the slag was fished out and then weighed. A sample was taken and subjected to direct-reading spectral analysis, revealing that it contained the following ingredients: Cu 0.0007%, Sb 0.25%, As 0.0051%, Sn 0.615%, Bi 0.003% and Ag 0.0008%. The molten lead was further heated up to 635° C., and the total content of antimony and arsenic in the pot was obtained. An antimony and arsenic removal composition was added in an amount which was 1.3 times more than the total content of antimony and arsenic. The composition contained the following ingredients: 10 wt % of Al, 80 wt % of Ca, 8 wt % of coke powder and 2 wt % of lead powder.

The stirrer was turned on. The antimony and arsenic removal agent was added into the molten lead, and stirred continuously for 30 min. After that, the machine was turned off, and the molten lead was allowed to stand and cooled down to 480° C. Coal powder or sawdust was added and stirred to remove the remaining calcium and aluminum, until a white pasty slag became a loose black powdery slag. The ash slag was fished out. A sample was taken and subjected to direct-reading spectral analysis, revealing that it contained the following ingredients: Cu 0.0007%, Sb 0.0004%, As 0.0002%, Sn 0.601%, Bi 0.003% and Ag 0.0008%.

Example 2: the agent for selective antimony and arsenic removal and tin retaining consisted of 25 wt % of aluminum, 72 wt % of calcium, 2 wt % of coke powder, and 1 wt % of lead powder, based on the total mass of the agent for selective antimony and arsenic removal and tin retaining of 100.

Secondary crude lead was weighed into a refining pot, heated for melting, and heated up to 490° C. A copper removal agent was used to remove copper, and the ash slag was fished out and then weighed. A sample was taken and subjected to direct-reading spectral analysis, revealing that it contained the following ingredients: Cu 0.0005%, Sb 0.15%, As 0.0031%, Sn 0.517%, Bi 0.0026% and Ag 0.001%. The molten lead was further heated up to 605° C., and the total content of antimony and arsenic in the pot was obtained. An antimony and arsenic removal composition was added in an amount which was 1.2 times more than the total content of antimony and arsenic. The composition contained the following ingredients: 25 wt % of Al, 72 wt % of Ca, 2 wt % of coke powder and 1 wt % of lead powder.

The stirrer was turned on. The antimony and arsenic removal agent was added into the molten lead, and stirred continuously for 35 min. After that, the machine was turned off, and the molten lead was allowed to stand and cooled down to 450° C. Coal powder or sawdust was added and stirred to remove the remaining calcium and aluminum, until a white pasty slag became a loose black powdery slag. The slag was fished out. A sample was taken and subjected to direct-reading spectral analysis, revealing that it contained the following ingredients: Cu 0.0005%, Sb 0.0003%, As 0.0002%, Sn 0.501%, Bi 0.0026% and Ag 0.00098%.

Example 3: the agent for selective antimony and arsenic removal and tin retaining consisted of 30 wt % of aluminum, 67 wt % of calcium, 2 wt % of coke powder, and 1 wt % of lead powder, based on the total mass of the agent for selective antimony and arsenic removal and tin retaining of 100.

Secondary crude lead was weighed into a refining pot, heated for melting, and heated up to 510° C. A copper removal agent was used to remove copper, and the ash slag was fished out and then weighed. A sample was taken and subjected to direct-reading spectral analysis, revealing that it contained the following ingredients: Cu 0.0003%, Sb 0.08%, As 0.0041%, Sn 0.685%, Bi 0.0027% and Ag 0.0007%. The molten lead was further heated up to 595° C., and the total content of antimony and arsenic in the pot was obtained. An antimony and arsenic removal composition was added in an amount which was 1.4 times more than the total content of antimony and arsenic. The composition contained the following ingredients: 30 wt % of Al, 67 wt % of Ca, 8 wt % of coke powder and 2 wt % of lead powder.

The stirrer was turned on. The antimony and arsenic removal agent was added into the molten lead, and stirred continuously for 30 min. After that, the machine was turned off, and the molten lead was allowed to stand and cooled down to 480° C. Coal powder or sawdust was added and stirred to remove the remaining calcium and aluminum, until a white pasty slag became a loose black powdery slag. The slag was fished out. A sample was taken and subjected to direct-reading spectral analysis, revealing that it contained the following ingredients: Cu 0.0003%, Sb 0.0005%, As 0.0002%, Sn 0.661%, Bi 0.0028% and Ag 0.0007%.

What is claimed is:

1. A selective antimony and arsenic removal and tin retaining agent for refining secondary crude lead, wherein the selective antimony and arsenic removal and tin retaining agent, in a mass percentage, consists of: 10-30 wt % of aluminum, 65-85 wt % of calcium, 1-10 wt % of coke powder, and 1-2 wt % of lead powder, based on a total mass of the antimony and arsenic removal and tin retaining agent of 100, wherein the calcium, the aluminum, the coke powder, and the lead powder are thoroughly mixed at the mass percentage to produce the selective antimony and arsenic removal and tin retaining agent.

2. A method of using the selective antimony and arsenic removal and tin retaining agent for refining secondary crude lead according to claim 1, wherein the selective antimony and arsenic removal and tin retaining agent is used for refinement and antimony and arsenic removal production of primary lead and secondary crude lead; and the method comprises the following steps:

Step (1): weighing the calcium, the aluminum, the coke powder, and the lead powder according to the mass percentage, and uniformly mixing the calcium, the aluminum, the coke powder, and the lead powder to form the selective antimony and arsenic removal and tin retaining agent;

Step (2): taking a sample from a secondary crude lead and subjecting the sample to a spectral analysis to determine a total content of antimony and arsenic in a refining pot, followed by heating up the sample to 580-650° C. to obtain a molten compound, and then adding the selective antimony and arsenic removal and tin retaining agent into the refining pot, wherein an adding amount of the selective antimony and arsenic removal and tin retaining agent is 1-1.5 times more than the total content of the antimony and the arsenic; turning on a stirrer to stir the molten compound to generate a vortex, allowing the selective antimony and arsenic removal and tin retaining agent to melt into the molten compound and combine with the antimony and the arsenic to form an antimonide, wherein the antimonide floats on the surface of the molten compound, and further stirring the molten compound for 10-60 min after adding the selective antimony and arsenic removal and tin retaining agent; and Step (3): allowing the molten compound to stand and cool down to reduce a temperature of the molten compound to 480° C. or lower, and adding a slagging agent or sawdust to the molten compound to form a paste slag, followed by stirring to remove the remaining calcium and aluminum until the paste slag becomes a black powder slag, and removing the black powder slag, so that the total content of the antimony and the arsenic in the molten compound is reduced to 0.0005% or less.

* * * * *